Patented Apr. 20, 1948

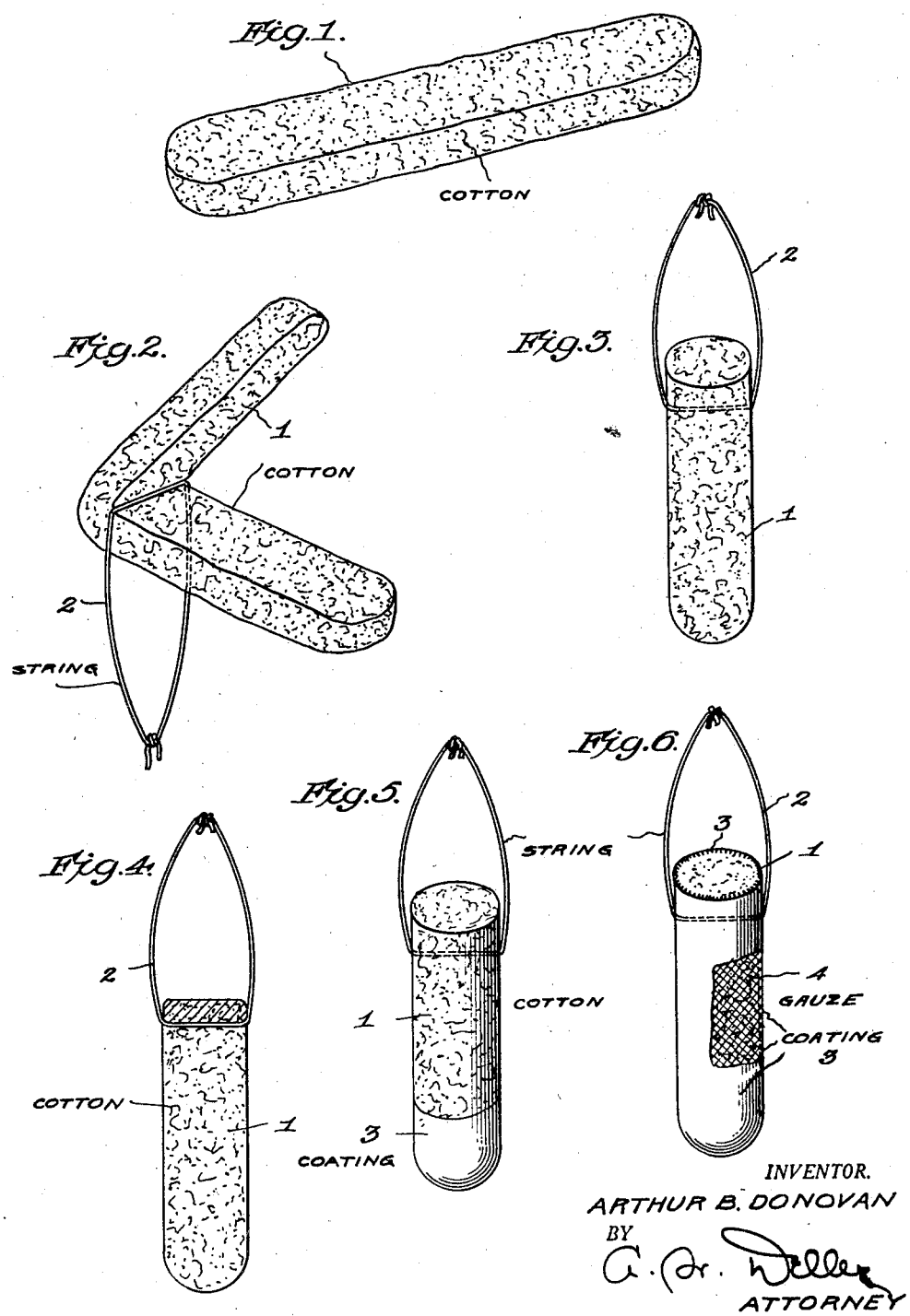

2,440,141

UNITED STATES PATENT OFFICE 2,440,141

CATAMENIAL TAMPON

Arthur B. Donovan, Newton Center, Mass.

Original application December 7, 1940, Serial No. 368,989. Divided and this application January 5, 1944, Serial No. 517,023

2 Claims. (Cl. 128—285)

My invention relates to tampons and, more particularly, to an improved catamenial tampon capable of being provided with a coating of novel composition, and to a method for manufacturing the same.

Tampons have been in use for many years for absorbing discharges and secretions from body cavities. Although preferable in many respects to surface applications for this purpose, the use of tampons has been limited by certain disadvantageous features. The prior art tampons were difficult to insert, especially when they had to be large enough to absorb a heavy flow of body fluid. This objectionable characteristic was particularly noticeable with catamenial tampons, where delicate membranes can be chafed and abraded by their use.

The prior art attempted to avoid these handicaps in the use of catamenial tampons by providing a tube or other applicator through which the tampons could be inserted. Another method employed for facilitating the insertion was to lubricate the tampon. Neither of these methods was satisfactory, especially as neither of them solved the problem of providing sufficient bulk of absorbent material to insure absorption of a heavy flow.

Subsequently, the prior art sought to introduce a larger mass of absorbent material by compressing the same and providing a capsule, shell or thimble for retaining the absorbent material in compressed form. Although tampons of this type had the advantage of getting a larger mass of absorbent material into the vaginal cavity and the further advantage of affording a means for the insertion of medicaments, if desired, there were certain attendant disadvantages which greatly restricted their use. In the first place, the use of a separate capsule or shell made the product too expensive for popular use. Another defect lay in the necessary thickness of a separate capsule, as tests showed that such separate capsules upon tampons took upwards of an hour to dissolve and to permit absorption of the menstrual fluid by the material within them.

The defects of a separate shell were partly overcome by the development of a coated tampon. However, the prior art coated tampons were not adapted for the absorption of as large an amount of menstrual fluid as the mass of absorbent material which they held seemed to indicate. For example, in U. S. Patent No. 2,123,750, Schulz described a catamenial tampon which comprised a cylindrical body of tightly wrapped cotton having a film of methyl cellulose coated upon the surface thereof. This coating was adapted to prevent the expansion of the absorbent material even after its insertion in the vagina, so that it was impossible to utilize the absorbent property of the cotton to its full extent. Methyl cellulose alone disperses very slowly at best, and very little dispersion of Schulz's coating film was effected upon contact with menstrual fluids of high viscosity and high surface tension.

Thus, although many attempts were made to solve these outstanding problems of the prior art, none of these former attempts, so far as I am aware, proved to be satisfactory from a popular and commercial standpoint, and none of the devices produced by the prior art were found to give wholly satisfactory results. I have found that these prior art handicaps and disadvantages can be easily and successfully overcome.

It is an object of the present invention to provide a method for manufacturing tampons of smooth surface for easy insertion into a body cavity.

It is another object of this invention to provide a method for manufacturing catamenial tampons of compressed absorbent material having a smooth surface adapted for easy insertion into the female vagina whereby a large mass of absorbent material can be introduced therein without danger of abrading delicate vaginal tissues.

It is a further object of the invention to provide a method for manufacturing catamenial tampons having a relatively large mass of absorbent material compressed into a relatively small volume of substantially cylindrical form and having a smooth coated surface adapted to retain said absorbent material in compressed form while dry and adapted to disintegrate upon coming in contact with menstrual fluid to permit expansion of the absorbent material and absorption thereby of a relatively large volume of said fluid.

It is also the intention of the present invention to provide a tampon adapted for easy insertion into a body cavity, whether natural or artificial, whereby fluid discharges therefrom can be readily absorbed.

My invention also provides a catamenial tampon for easy insertion into and relatively comfortable retention by the female vagina during catamenia for absorption thereof.

Another object of my invention is to provide a catamenial tampon adapted for easy insertion and yet capable of absorbing a relatively heavy menstrual flow.

The present invention contemplates the provision of a tampon subjecting a large mass of absorbent material to compression and heat to compact same into a relatively small volume whereby insertion into body cavities is facilitated.

It is also an object of the invention to provide a catamenial tampon having a large mass of absorbent material heat-compressed into a size and shape adapted to facilitate insertion of said tampon into the vaginal cavity and capable of having a coating thereon adapted to retain said heat-compressed mass of absorbent material in its original heat-compressed size and shape during insertion.

The invention also contemplates the provision of a catamenial tampon having a relatively large mass of absorbent material heat-compressed into a relatively small volume of substantially cylindrical shape and capable of being coated with a substance smooth when dry, slippery when wet and capable of retaining the absorbent material in compressed form while dry whereby a catamenial tampon adapted for easy insertion into the vagina is provided.

It is also within the contemplation of the invention to provide a tampon comprising heat-compressed absorbent material and capable of receiving a retentive coating of material having smoothness when dry, slipperiness when wet and stability under ordinary atmospheric conditions, said coating being capable of disintegration upon contact with body fluids to permit expansion of the absorbent material and to give increased absorption of said fluids.

The invention further purposes to provide a catamenial tampon of heat-compressed absorbent material having a retentive coating or film capable of rapid disintegration upon contact with fluids of high viscosity and high surface tension whereby a relatively large mass of absorbent material can be introduced into the vagina in relatively small volume and can there expand upon contact with menstrual fluid to absorb a relatively large volume of said fluid.

Still another object of my invention is to provide a catamenial tampon of compressed absorbent material having a retentive coating upon at least one end thereof capable of retaining said absorbent material in compressed form for insertion into operative position.

This invention has the additional purpose of providing a catamenial tampon of compressed absorbent material having a retentive coating upon the surface thereof, said coating being of novel composition having the properties of smoothness when dry, slipperiness when wet and stability under ordinary atmospheric conditions to facilitate the insertion of the tampon into the vaginal cavity in operative position and being capable of disintegration upon contact with the menstrual fluid to permit expansion of the absorbent material and to give increased absorption of said menstrual fluid, thereby providing a catamenial tampon having flexibility, smoothness, slip, and lubricant properties whereby said tampon can be readily inserted into the vagina without irritation and chafing thereof.

Moreover, the invention has in view the provision of a catamenial tampon having a coating composition comprising a water-dispersible, film-forming material capable of retaining a relatively large mass of absorbent material in a relatively small volume whereby the insertion into the vagina of a mass of absorbent material capable of absorbing a large volume of menstrual fluid is greatly facilitated.

It is also an aim of my invention to provide a catamenial tampon having a chemical coating film upon the surface thereof, said chemical coating film possessing a surface tension substantially that of the menstrual fluid to permit the rapid penetration into the tampon of a relatively large volume of said menstrual fluid whereby a large volume of said fluid can be rapidly absorbed.

In addition, this invention provides a catamenial tampon of heat-compressed absorbent material having a coating film upon the surface thereof, said film containing a bland plasticizer for increasing the smoothness and flexibility of said film, thereby providing a tampon which can be easily inserted in operative position without danger of chafing or irritating delicate vaginal membranes.

It is also an aim of my invention to provide a catamenial tampon having a coating film upon the surface consisting of a tension reductant capable of lowering the surface tension of the menstrual fluid to permit the rapid penetration into the tampon of a relatively large volume of said menstrual fluid whereby a large volume of said fluid can be rapidly absorbed.

In addition, this invention provides a catamenial tampon of heat-compressed absorbent material having a coating film upon the surface thereof, said film containing a bland plasticizer for increasing the smoothness and flexibility of said film, thereby providing a tampon which can be easily inserted in operative position without danger of chafing or irritating delicate vaginal membranes.

My invention further provides a coating composition adapted for use on my heat-compressed catamenial tampons comprising a film-forming material capable of retaining a relatively large mass of absorbent material in a relatively small volume whereby the insertion into the vagina of a mass of absorbent material capable of absorbing a large volume of menstrual fluid is greatly facilitated.

Furthermore, the invention provides a coating composition adapted for use on my heat-compressed catamenial tampons of compressed absorbent material, said composition comprising a water-dispersible, film-forming material and a surface tension depressant and being capable of rapidly disintegrating upon contact with menstrual fluid whereby said absorbent material can expand to absorb a large volume of the menstrual fluid and whereby the coating composition can be dissolved in said fluid without any residue being left in insoluble form therein.

My invention further aims to provide a coating composition adapted for use on my heat-compressed catamenial tampons comprising, in addition to a water-dispersible, film-forming material, a surface-active agent capable of lowering the surface tension of menstrual fluid, thereby providing a coating having a dispersive effect upon said fluid whereby a large volume of said fluid can rapidly penetrate into the tampon and can be rapidly absorbed thereby.

An additional object of this invention is to provide a coating composition adapted for use on my heat-compressed catamenial tampons wherein is contained a bland plasticizer adapted to increase the slip and flexibility of said coating and to facilitate the insertion of the tampon into operative position whereby the danger of abrading delicate vaginal tissues is avoided.

Other objects and advantages of the present invention will be apparent from the following description of a preferred embodiment, taken in conjunction with the accompanying drawing, in which:

Fig. 1 illustrates a perspective view of a strip of absorbent material capable of being compressed into my improved tampon;

Fig. 2 is a perspective view of my improved tampon in an open position to show its internal construction and to show the location of the withdrawal string;

Fig. 3 shows my tampon in its compressed state with a withdrawal string and a rounded nose for easy insertion;

Fig. 4 is a sectional view of Fig. 3 illustrating the internal construction of my tampon;

Fig. 5 illustrates a perspective view of my compressed tampon with a coating on the rounded nose; and Fig. 6 depicts a view similar to Fig. 1 of a modification of my invention, partly broken away to indicate its structure.

Broadly stated, the present invention provides a tampon having an amount of absorbent material sufficiently large to absorb the quantity of fluid expected to be discharged from the body cavity into which it is adapted to be inserted. The absorbent material is rolled or plaited or otherwise brought into a form adaptable for insertion into the body cavity. When providing tampons for absorption of catamenia, I have found that the most convenient form for the tampon to take is that of a cylindrical body having one end with a rounded nose. A draw string or other withdrawal means is wrapped or otherwise anchored in the rolls or plaits of absorbent material.

My catamenial tampon can be tightly rolled or otherwise compressed into a small enough volume to permit of its being inserted into the vaginal cavity. I have found that the use of heat at about 70° F. to about 400° F., and preferably at about 300° F., is effective in further compressing the absorbent material and keeping it in a self-sustaining condition. A coating is provided upon the surface of the tampon to retain the absorbent material in this heat-compressed form and to furnish a smooth, flexible surface, especially on the rounded nose. It will be appreciated that both of these factors contribute to facilitating the insertion of the tampon.

In coating the compressed tampon, I have found that satisfactory results can be obtained by applying the coating at only one end of the tampon. Thus, if desired, only the end which is first introduced into the vaginal cavity, that is, the preferably rounded end, need be coated with my novel composition.

For most effective use, the coating composition must have the desirable properties of smoothness when dry and slipperiness when wet. The coating should remain stable under ordinary atmospheric conditions, so that the tampon can be easily handled, packed or shipped without deterioration. Although possessing such stability under normal conditions, my novel coating composition is adapted to disintegrate rapidly under contact with body fluids, thus permitting the expansion of the absorbent material which is retained in compressed form by the coating before disintegration.

My novel coating composition comprises a film-forming substance which is adapted to provide a binding or retentive surface for the purpose of retaining the absorbent material in compressed form. The coating also serves to prevent irritation of delicate tissues by the roughness of the cotton fibres at the tip of the tampon, upon introducing the same into the vaginal tract. This film-forming substance, while strong enough to resist the expansive force of the compressed material, is water-dispersible, so that it can readily dissolve in the body fluids, especially in the presence of surface tension depressants. The rapid dispersion of the film or coating permits the swift penetration of these body fluids into the compressed cotton and simultaneously allows the cotton to expand to facilitate the absorption of a relatively large volume of the fluids. This water-dispersible, film-forming substance is present in my coating composition to an amount of about 30 to about 99%, and preferably about 64 to about 75%.

The coating according to my invention also contains a surface-active agent adapted to depress the surface tension of fluids in which it is dissolved. Since the menstrual fluid is of relatively high viscosity and of high surface tension, it is desirable to employ such a surface tension reductant, so that the surface tension of the menstrual fluid is lowered to permit its rapid penetration into the film or coating. This has the effect of increasing the rate of dispersion of the film into the body fluids. Moreover the lowering of viscosity and surface tension also facilitates absorption of said fluids by the cotton of the tampon. About 0.01 to about 40%, and preferably about 1 to about 10%, of the surface-active agent has been found to give satisfactory results in my novel composition. It will be appreciated that the surface-active agent selected must be free from toxicity and from any irritant effect.

Although the water-dispersible, film-forming substance of my composition is selected with a view to its providing a smooth surface when dry and slipperiness when wet, I prefer to include a water-dispersible fatty or waxy substance in my coating composition for slightly increasing the slip and lubricant properties of the coating. While the addition of such a substance is not essential, I consider it desirable to provide a coating composition which has about 0.5 to about 30%, and preferably about 1 to about 10%, of such fatty or waxy substance. The substance selected should be characterized by blandness and, of course, should not be harmful to the delicate vaginal tissues.

I have found that, after a period of atmospheric dryness, there is a tendency for some of my coatings to become inflexible. At times, when using certain compositions and in an extremely dry climate, this inflexibility may develop into brittleness. Since flexibility is a desirable quality in my improved tampons, greatly facilitating their ready insertion into the vaginal cavity, and since brittleness may lead to the danger of chafing or abrading the vaginal membranes, I prefer to include an amount of plasticizer in my coating composition, especially where the tampons are expected to be stocked in a dry climate. About 1 to about 40%, and preferably about 25 to about 32%, of plasticizer has been found sufficient to give satisfactory results. When an excessive amount of plasticizer is added to the composition, the coating upon the tampon tends to become soft, sticky and unstable, especially in rather humid weather.

In selecting a water-dispersible film-forming substance for my novel composition, I have found a wide variety of materials to be adaptable for my purpose, although some of these are more difficultly dispersible than others. Thus, satisfactory results have been obtained by the use of gelatine, dextrin, glucose, methyl cellulose, sodium alginate, ulmus, agar, polyvinyl alcohol, polybasic borates such as glycol borate or glycerol borate, or practically any natural or synthetic water-dispersible gums or resin. Alkali soaps, such as Castile soap, and triethanolamine stearate can also be satisfactorily employed.

Among the gums or resins which I have successfully employed are Irish moss, gum acacia, gum tragacanth, gum karaya, gum ghatti, quince seed gum, carob seed gum, and psyllium seed gum. I have found that any of these substances may be used, either singly or in mixtures of two or more, as the film-forming constituents of my novel coating composition.

My surface-active agent is a non-toxic, non-irritant substance having a significant depressant effect upon the surface tension of body fluids. Among the substances which I have found suitable for use in my coating composition are included the following chemical classes: quaternary ammonium salts, where the nitrogen atom bears an aliphatic group or groups of at least eight carbon atoms, such as dioctyl methyl ammonium chloride; alkali metal salts of the fatty acids containing at least eight carbon atoms, such as sodium stearate and other soaps, and of the resin acids, such as sodium abietate; alkali metal alkyl sulfates or phosphates having about 8 to about 34 carbon atoms, such as sodium lauryl sulfate and potassium myristyl sulfate; alkali metal salts of the sulfated N-ethyl fatty acid amides having the formula $$R.CONHC_2H_4SO_4Na$$

where R is any alkyl group having about 8 to about 34 carbon atoms and Na represents sodium or other alkali metal ion, such as the sodium sulfated ester of N-ethyl stearyl amide; alkali metal salts of the sulfuric ester of aliphatic acid esters of glycol, $R.COOC_2H_4SO_4Na$, where R represents any alkyl group of about 8 to about 34 carbon atoms and Na stands for sodium or other alkali metal ion, such as the potassium sulfated ester of glycol laurate; alkali metal salts of alkyl aromatic sulfonic acids, such as sodium dodecanyl naphthalene sulfonate; alkali metal sulfates of an alkyl ester of a dibasic acid of the succinic acid type, $$R.OOC.CH_2.CHSO_4Na.COO.R$$

where R is any alkyl group of about 8 to about 34 carbon atoms and Na represents sodium or other alkali metal ion, as, for example, the sodium dioctyl sulfate of succinic acid; alkali metal secondary alcohol sulfates, such as the sodium sulfate of dioctyl carbinol; polyhydric alcohols, such as sorbitol and mannitol; alkanol-amines, such as ethanolamine and propanolamine; alkali metal salts of sulfonated oils, such as the sodium salts of sulfonated castor oil and sulfonated olive oil; and alkali carbonates, borates, ortho-, meta- and pyro-phosphates, and silicates. Indeed, almost any of the non-toxic, non-irritant surface-active agents known to the art—a representative list is given in the Journal of Industrial and Engineering Chemistry, volume 31, page 66 (1939), and additional examples are to be found in the "List of Commercially Available Detergents, Wetting, Dispersing, and Emulsifying Agents," June, 1940, by H. L. Cupples of the Division of Insecticide Investigations of the U. S. Department of Agriculture—can be satisfactorily used in preparing my novel coating composition.

Just as the film-forming materials suitable for use in my composition vary in dispersibility, so have I found that certain of the surface-active agents herein set forth are of greater efficiency than others. Where a slowly dispersing film-forming substance is employed, a more efficient surface-active agent, or a higher percentage of such agent, must be added in the composition than where a film-forming substance which is rapidly dispersible is used. Thus, methyl cellulose or gelatin, if employed alone for my coating, would take at least an hour to disperse in body fluids; consequently, when using such substances in the coating composition, a highly effective surface-active agent is required (and in relatively higher proportions) than would be needed if easily-dispersible substances, such as gum acacia or dextrin, were employed. Another factor which influences the proportion of surface-active agent to be added is the amount of plasticizer present, as less of the former is necessary when the content of plasticizer is increased.

Fatty or waxy substances for the coating composition according to my invention can be chosen from the polyhydric alcohol esters of aliphatic acids. Suitable esters are those composed of alcohols having from two to about six hydroxy groups, such as ethylene glycol, propylene glycol, glycerol and sorbitol, and aliphatic acids having about 8 to about 34 carbon atoms, such as stearic, cerotic and brassidic acids. Thus, I have found glycol monostearate, glyceryl monomyristate or sorbitol monopalmitate to be satisfactory for my purpose. Mixtures of two or more of these esters can be employed as the fatty or waxy constituents of my composition.

I have found that the polyhydric alcohols having from two to about six hydroxyl groups can be successfully used as plasticizers in preparing my coating composition. Ethylene glycol, glycerol, sorbitol, alpha-propylene glycol or mannitol or mixtures of these alcohols, when included in the coating of my tampon, provide a product which is flexible and free from brittleness and which can be inserted without danger of abrading the delicate tissues of the vaginal cavity. Polyhydric alcohols are also included in the example of classes of surface-active agents which I have disclosed supra, and it will be appreciated that some substances may have more than one property which is of value in formulating my coating composition. Thus, sorbitol, which is preferably utilized as a plasticizer, also acts as a surface tension reductant for body fluids. Similarly, triethanolamine stearate can be used, not only as a film former, but as a surface-active agent too.

For the purpose of giving those skilled in the art a better understanding of carrying the invention into practice, illustrative embodiments thereof will now be described.

As shown in the drawings, a sheet of absorbent cotton 1 of about three and one-half inches in length and of suitable width and thickness has a loop of string 2 passed about its approximate middle (see especially Fig. 2), and the sheet of cotton is then doubled over this string. The cotton is then tightly compressed in substantially cylindrical form, the loop of string thus being securely anchored therewithin to serve as a draw string. While still under compression, the cylinder is heated to about 300° F., whereby an ironing effect is produced, and the end of the cylinder opposite to that folded over the draw string is then rounded off with a rounded nose. This rounded end or nose is then dipped into a solution of my novel coating composition, and the composition is allowed to dry to form a coating 3 thereon. It will be appreciated that the coating may instead be applied over the full length of the tampon, although the expansion of the absorbent cotton throughout its uncoated portion is of only slight degree and is not objectionable when the leading end of the tampon is maintained in compressed and constricted form.

In another modification of my invention, a square layer of absorbent cotton 1 of about 3½ inches on a side is placed upon a piece of gauze 4 of approximately equal dimensions and having a mesh of about 20 to about 160 threads per inch. As shown in Fig. 6, the gauze 4 thus serves as a backing for the absorbent cotton 1, and the two are then tightly rolled, preferably spirally, into cylindrical form. When rolling the cylinder, a loop of string 2 is securely wrapped into the rolls with one end of the loop extending from an end of the cylinder to serve as a draw string. In this construction, it is evident that the gauze is around the entire outer surface of the absorbent cotton. As is well known, a tampon made of cotton alone or of gauze alone is difficult to insert into the vaginal cavity and, upon being introduced, causes chafing of the vaginal tissues. This new structural modification, however, produces an intermeshing of surface cotton fibers and gauze, resulting in a smooth, satin-like finish. The cylinder is then subjected to a heat of about 300° F. to produce an ironing effect. The end of the cylinder opposite from that from which the draw string protrudes is thereafter rounded off to provide a rounded nose to facilitate insertion.

While the heat-compressed tampon, even in this form, is sufficiently smooth to give greater ease of insertion and freedom from chafing and irritation than can be obtained with prior art devices of this character, its smoothness, lubricant properties and general adaptability for the purpose intended are greatly increased by coating the tampon with my novel composition. To accomplish this, the entire tampon is dipped into a solution of my coating composition to form a coating 3 thereon. Those skilled in the art will recognize that the coating may instead be applied only to the rounded end of the tampon as in the modification described supra. The coating is then permitted to dry at a moderate temperature (about 20° C. to about 50° C.), and the tampon is ready for use.

As will be appreciated from the foregoing, a great number of combinations of the constituents which I have set forth can be prepared for use as a coating composition for my improved tampon. A few examples of illustrative compositions which have produced satisfactory coatings for my purpose will now be given.

Example 1

A mixture containing the following constituents within the indicated ranges is dissolved in sufficient water to give a solution of desired consistency:

| | Per cent |
|---|---|
| Gum acacia | About 59 to about 75 |
| Sorbitol | About 24 to about 35 |
| Glycol monostearate | About 0.5 to about 5 |
| Sodium lauryl sulfate | About 0.1 to about 5 |

Satisfactory results have been obtained by coating my tampons with the following mixture dissolved in water in the proportion of about 100 parts of the mixture to about 75 parts by weight of water:

| | Per cent |
|---|---|
| Gum acacia | About 64 |
| Sorbitol | About 32 |
| Glycol monostearate | About 1 |
| Sodium lauryl sulfate | About 3 |

After the tampon is dipped in this solution and permitted to dry, the coating composition thereon comprises a mixture essentially the same as that herein set forth.

Example 2

Another mixture providing satisfactory coatings can be made up for solution in water as follows:

| | Per cent |
|---|---|
| Gum acacia | About 60 to about 80 |
| Sorbitol | About 10 to about 30 |
| Glyceryl monomyristate | About 1 to about 5 |
| Sodium sulfate of dioctyl succinate | About 0.1 to about 5 |

A specific composition within these ranges contains the following proportions:

| | Per cent |
|---|---|
| Gum acacia | About 60 |
| Sorbitol | About 30 |
| Glyceryl monomyristate | About 5 |
| Sodium sulfate of dioctyl succinate | About 5 |

Example 3

Satisfactory results are likewise obtained by dissolving the following mixture in water and coating a tampon therewith:

| | Per cent |
|---|---|
| Dextrin | About 65 to about 80 |
| Glycerol | About 5 to about 25 |
| Sorbitol monostearate | About 1 to about 10 |
| Sodium salt of sulfonated olive oil | About 1 to about 5 |

Example 4

Similarly, the following combination can be suitably substituted for others set forth supra, when preparing my coating composition.

| | Per cent |
|---|---|
| Sodium oleate | About 5 to about 15 |
| Propylene glycol stearate | About 5 to about 15 |
| Glycerol | About 5 to about 20 |
| Sodium pyrophosphate | About 1 to about 10 |
| Gum acacia | About 40 to about 60 |

My improved coated and compressed tampon successfully overcomes the disadvantages of prior art tampons. The smooth, flexible, retentive coating which I provide holds the absorbent cotton in compressed form, so that it can be readily inserted into the vaginal cavity without irritation. The coating acquires slipperiness and lubricant properties when wet and can be retained with relative comfort. During the catamenia, the coating is disintegrated by the menstrual fluid, and the absorbent material expands. The surface-active agent which is present in my coating acts to depress the surface tension of the menstrual fluid, and said fluid rapidly penetrates into the tampon and is absorbed thereby. In this manner, a large volume of menstrual fluid can be absorbed in the increased volume of the absorbent material. I have found that the complete disintegration of the coating renders the tampon equally absorptive throughout its entire volume, and, moreover, no part of the coating remains as an insoluble residue to be subsequently mixed with body secretions. The fatty or waxy substance which I have provided, though not essential, is useful in giving added smoothness and slipperiness to my coating, and the plasticizer acts to provide flexibility. It will be appreciated that the coating can be prewetted, if desired, to give greater slipperiness for insertion.

It will be observed that my improved tampon comprises a body of absorbent material having water-dispersible film-forming means thereupon for retaining said material in compressed form for easy insertion into a body cavity. Means are also provided for reducing the surface tension of body fluids to the end that said fluids may rapidly penetrate the tampon and be absorbed therein. I prefer to provide lubricant means for increasing the slip of the tampon, and means for plasticizing the product are also preferably supplied. While, in general, I have found it convenient to employ a coating composition comprising a number of substances, each of which is primarily included to incorporate a single advantageous property in the coating and thus to provide one of the desired means, it will be appreciated by those skilled in the art that it is easily possible for a single substance to endow the coating with more than one of these means, as I have shown triethanolamine stearate and sorbitol to be capable of doing. Thus, there would be no objection to the use as a coating of a single natural product containing all of these principles and in combination as described herein.

The present application is a division of the copending application, Serial No. 368,989, filed on December 7, 1940, now Patent No. 2,340,311, dated February 1, 1944.

Although my invention has been described in connection with preferred embodiments and with specific examples, it will be observed that variations and modifications may be resorted to, as those skilled in the art will understand. These variations and modifications are considered to be within the scope of the present specification and the purview of the appended claims.

I claim:

1. A method of making tampons which comprises folding an elongated piece of absorbent cotton on itself to form a loose quantity sufficient to absorb body fluids, then tightly compressing the same to substantially cylindrical form, then while still under compression heating the same to about 300° F. to form a compressed and substantially self-sustaining tampon of a diameter proper for body insertion, then rounding off one end of the cylinder, and then coating the cylinder with a material which comprises a mixture of gum acacia, about 59% to 75%, sorbitol, about 24% to about 35%, glycol monostearate, about 0.5% to about 5%, and sodium lauryl sulfate, about 0.1% to about 5%.

2. A method of making tampons which comprises folding an elongated piece of absorbent cotton on itself to form a loose quantity sufficient to absorb body fluids, then tightly compressing the same to substantially cylindrical form, then while still under compression heating the same to about 300° F. to form a compressed and substantially self-sustaining tampon of a diameter proper for body insertion, then rounding off one end of the cylinder, and then coating at least the rounded end of the cylinder with a material which comprises a mixture of gum acacia, about 59% to 75%, sorbitol, about 24% to about 35%, glycol monostearate, about 0.5% to about 5%, and sodium lauryl sulfate, about 0.1% to about 5%.

ARTHUR B. DONOVAN.

REFERENCES CITED

The following references are of record in the file of this patent:

UNITED STATES PATENTS

| Number | Name | Date |
|---|---|---|
| 810,935 | Goldman | Jan. 30, 1906 |
| 1,074,245 | Casevitz | Sept. 30, 1913 |
| 1,964,911 | Haas | July 3, 1934 |
| 2,077,231 | Fourness et al. | Apr. 13, 1937 |
| 2,092,427 | Ross | Sept. 7, 1937 |
| 2,112,021 | Harris | Mar. 22, 1938 |
| 2,123,750 | Schulz | July 12, 1938 |
| 2,134,930 | Reynolds | Nov. 1, 1938 |
| 2,176,114 | Wells | Oct. 17, 1939 |
| 2,188,923 | Robinson | Feb. 6, 1940 |
| 2,215,573 | Beck | Sept. 24, 1940 |
| 2,286,817 | Knight | June 16, 1942 |
| 2,340,311 | Donovan | Feb. 1, 1944 |